US008851334B2

(12) United States Patent
Green et al.

(10) Patent No.: US 8,851,334 B2
(45) Date of Patent: Oct. 7, 2014

(54) POWDER DISPENSING APPARATUS

(71) Applicants: Scott D. Green, Irondale, AL (US); Joseph M. Wyatt, Pinson, AL (US)

(72) Inventors: Scott D. Green, Irondale, AL (US); Joseph M. Wyatt, Pinson, AL (US)

( * ) Notice: Subject to any disclaimer, the term of this patent is extended or adjusted under 35 U.S.C. 154(b) by 20 days.

(21) Appl. No.: 13/673,288

(22) Filed: Nov. 9, 2012

(65) Prior Publication Data
US 2014/0131390 A1    May 15, 2014

(51) Int. Cl.
| G01F 11/00 | (2006.01) |
| B65D 83/06 | (2006.01) |
| A47G 19/34 | (2006.01) |
| A47J 47/01 | (2006.01) |

(52) U.S. Cl.
CPC ............... *B65D 83/06* (2013.01); *A47G 19/34* (2013.01); *A47J 47/01* (2013.01)
USPC .......................................... 222/230; 222/511

(58) Field of Classification Search
CPC .... B65B 83/06; B65B 83/0409; A47G 19/34; A47G 19/30; A47J 47/01; A47J 47/04; A47J 47/06
USPC ............ 222/230, 402.25, 336, 365, 366, 246, 222/142.6, 510, 518, 457.5, 182, 500–503, 222/519–521, 511
See application file for complete search history.

(56) References Cited

U.S. PATENT DOCUMENTS

| 1,366,929 | A | * | 2/1921 | Pasnik | 222/487 |
| 1,439,259 | A | * | 12/1922 | Pasnik | 222/510 |
| 1,449,571 | A | * | 3/1923 | Younger | 222/246 |
| 1,491,529 | A | * | 4/1924 | Haeseler | 222/487 |
| 1,698,732 | A | * | 1/1929 | Pasnik | 222/449 |
| 1,749,853 | A | * | 3/1930 | Smith | 222/142.4 |
| 3,204,826 | A | * | 9/1965 | Fidel | 222/142.1 |
| 3,823,853 | A | * | 7/1974 | Alden | 222/365 |
| 5,259,537 | A | * | 11/1993 | Beers et al. | 222/246 |
| 5,490,615 | A | * | 2/1996 | Robbins et al. | 222/153.13 |
| 6,047,746 | A | | 4/2000 | Green | |
| 6,619,510 | B2 | | 9/2003 | Green | |
| 7,228,993 | B2 | * | 6/2007 | Yang | 222/365 |
| 7,555,360 | B1 | | 6/2009 | Green et al. | |
| 7,588,062 | B1 | | 9/2009 | Green | |
| 7,588,169 | B1 | | 9/2009 | Green et al. | |
| 7,861,671 | B2 | * | 1/2011 | Carter et al. | 119/72 |
| 8,037,908 | B1 | | 10/2011 | Green et al. | |
| 8,042,581 | B2 | | 10/2011 | Green et al. | |

* cited by examiner

*Primary Examiner* — Lien Ngo
(74) *Attorney, Agent, or Firm* — Bush Intellectual Property Law; Kenneth M. Bush

(57) ABSTRACT

A powder dispensing apparatus having a button assembly and a container, wherein the button assembly is removable from the container. The button assembly comprises a button housing and a button. The container has a flow control valve stabilizer with a flow control valve extending through the flow control valve stabilizer and into a dispensing opening at the bottom of the container to close the dispensing opening. Pushing the button on top of the dispenser into the button housing will cause the flow control valve to open the dispensing opening to deliver as much of the ingredients in the dispenser as the user desires. Releasing the button will cause the flow control valve to automatically close the dispensing opening.

8 Claims, 6 Drawing Sheets

POWDER DISPENSING APPARATUS

FIELD OF THE INVENTION

The present invention is directed to powder dispensing devices, and more particularly, to a compact valve assembly apparatus for dispensing a flowable, granulated powder.

BACKGROUND OF THE INVENTION

Devices are known for filling receptacles with granular, particulate, and/or powdered materials that are transported from a storage container into a receptacle. Dispensing mechanisms for these devices range from open containers with scoops to coin operated machines. Granular matter, such as sand, can be provided in various colors and can be dispensed from storage containers to produce a decorative art form in a transparent receptacle. Likewise, granular food products, such as powdered candy, can also be dispensed to produce a decorative art form in a receptacle with the added attraction of being edible. Providing sweeteners and creamers and other particulates to customers in bulk powder granule dispensers creates a number of problems.

Prior art powder dispensers are typically expensive to manufacture because many of them require complicated machinery and/or complicated housings. Prior art dispensers are also frequently complicated to use and are not easily cleaned or maintained. In addition, some powders are prone to clumping which can impede flow through the dispenser. What is needed is a powder dispenser that is simple to manufacture, simple to operate, reliable, and easy to clean and maintain that would be an improvement over prior art powder dispensers.

SUMMARY OF THE INVENTION

The present invention is a powder dispensing apparatus having a button assembly and a container. The button assembly is removable from the container and has a button housing and a button. The container has a flow control valve stabilizer at a first end of the container. A flow control valve extends through the flow control valve stabilizer and into a dispensing opening at a second opposite end of the container to close the dispensing opening. The flow control valve is biased to extend into the dispensing opening. The button causes the flow control valve to move out of the dispensing opening, thereby opening the dispensing opening, when the button is pushed into the button housing, wherein the button is biased to extend out of the button housing.

The flow control valve extends through a flow control valve spring. The flow control valve has a spring support which positions the flow control valve spring between the flow control valve stabilizer and the spring support to bias the flow control valve into the dispensing opening to close the dispensing opening. The button housing has two levers. Each of the levers has a spring arm, a button arm, and a flow control valve arm, wherein each of the spring arms are connected to a button housing spring which biases the spring arms towards each other so that the button arms are biased to engage the button and to extend the button out of the button housing. The flow control arms are biased to rotate away from a knob on a first end of the flow control valve. The first end of the flow control valve extends into the button housing, wherein when the button is pushed into the button housing, the button arms are rotated towards the container. The flow control valve arms are rotated towards the knob to push the knob towards the button and pull a second opposite end of the flow control valve out of the dispensing opening. The spring arms are rotated away from each other so that the button housing spring is stretched and the flow control valve spring is compressed. The flow control valve has one or more agitators attached thereto to agitate material within the container as the flow control valve moves into and out of the dispensing opening. When the button assembly is removed from the container an opening into the container is provided to fill the container with material.

An advantage of the present invention is a powder dispenser have a button on top of the dispenser which, when pushed down, will cause the dispensing opening to open as long as a user desires to deliver as much of the ingredients in the dispenser as the user desires.

Another advantage is the ability to remove the button and its housing from the container so that the container can easily be filled with any desired powdered, particulated, or granulated substance.

Another advantage is that the powder dispenser can be constructed so that a user can hold the powder dispenser in one hand and operate it with that hand while using the other hand to hold a container to receive the powder dispensed from the container.

Another advantage is a powder dispenser that is simple and inexpensive to manufacture and assemble.

Another advantage is a powder dispenser which is easy to clean and maintain.

DETAILED DESCRIPTION OF THE INVENTION

While the following description details the preferred embodiment of the present invention, it is to be understood that the invention is not limited in its application to the details of construction and arrangement of the parts illustrated in the accompanying drawings, since the invention is capable of other embodiments and of being practiced in various ways.

Figure 1:
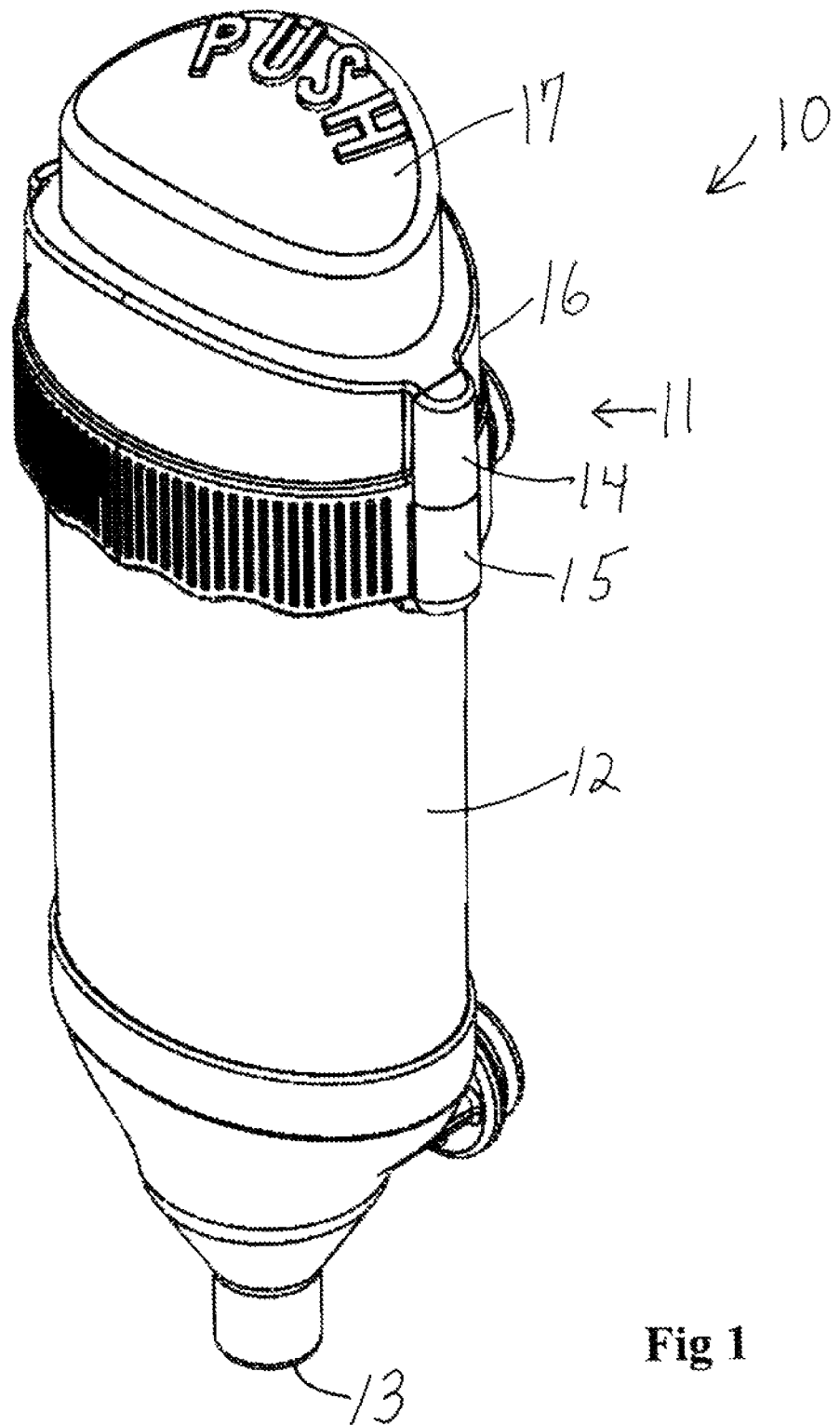
FIG. 1 shows the powder dispenser of the present invention.

FIG. 1 shows the powder dispenser 10 of the present invention. Powder dispenser 10 has a button assembly 11 and a container 12. The bottom end of container 12 has a dispensing opening 13 for the dispensing of powder, granular material, particulate matter, and the like. The button assembly 11 consists of a button housing 16 and a depressible button 17. The button housing 16 has a locking mechanism 14 which engages a mating locking mechanism 15 on container 12 so that the button assembly 11 can be reversibly attached to the container 12 by methods well known in the art.

Figure 2:
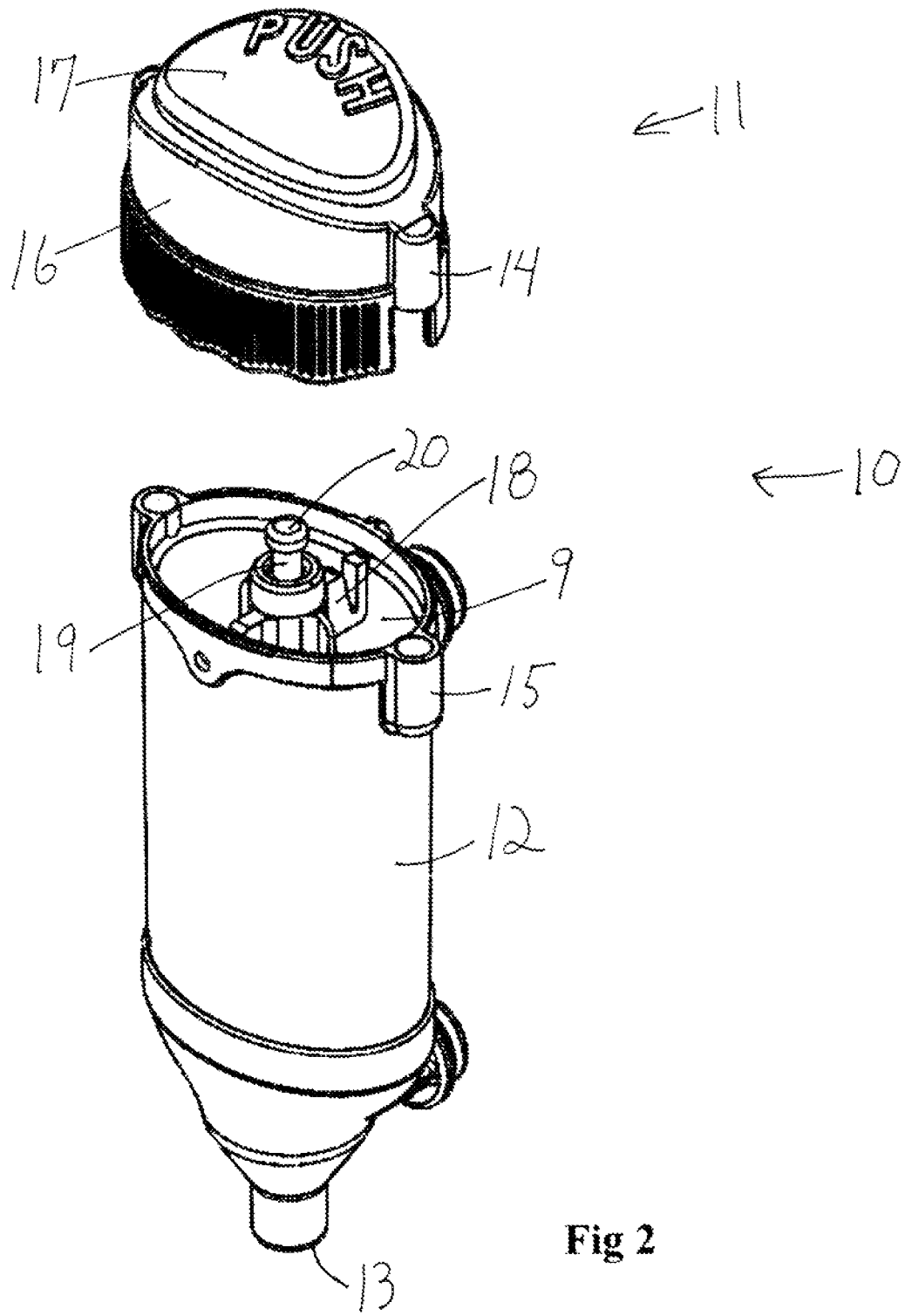
FIG. 2 shows the button assembly separated from the container as would occur to fill the container with powder or other material.

FIG. 2 shows the button assembly 11 separated or removed from the container 12 as would be done to fill container 12 with powder or other material. FIG. 2 further shows the opening 9 at the top of container 12 through which container 12 can be filled with powder or other material. A flow control valve stabilizer 18 is attached to the inside of the container 12 and has a central opening through which a flow control valve 19 passes. A knob 20 is formed on the top end of the control valve 19.

Figure 3:
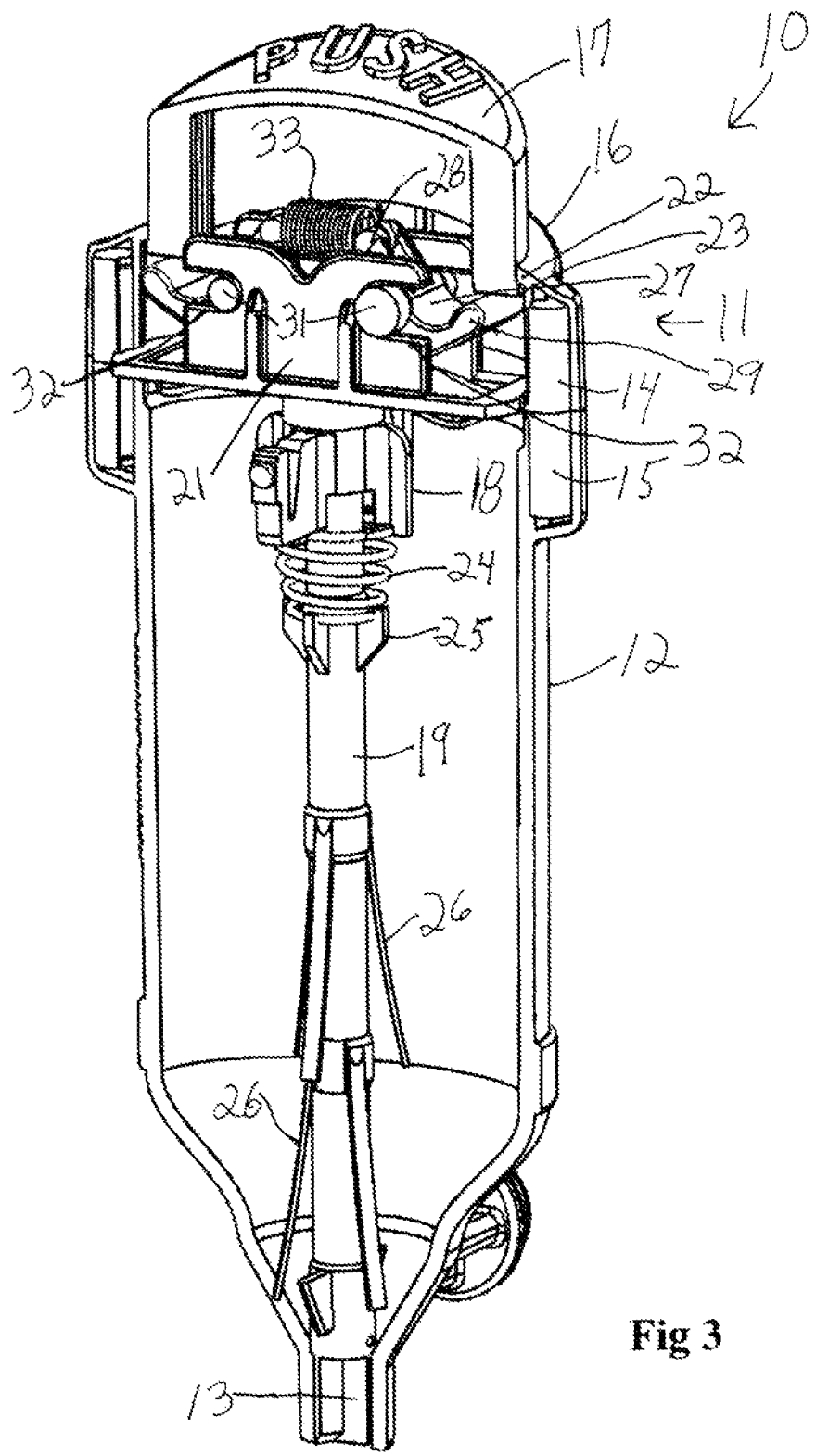
FIG. 3 shows a section view through the dispenser in a valve closed position.

FIG. 3 shows a section view through the dispenser 10 in a valve closed position. The flow control valve 19 extends downward through the flow control valve stabilizer 18, through a flow control valve spring 24 and into the dispensing opening 13 at the bottom of the container 12. The spring 24 engages a spring support 25 on the flow control valve 19 and is positioned between the spring support 25 and the flow control valve stabilizer 18. The spring 24 biases (pushes) the control valve 19 downward into the dispensing opening 13 to close dispensing opening 13, thereby preventing the outflow of material from the container 12 through opening 13. Flow control valve 19 also has agitator members 26 attached thereto, which agitate and mix the powder or other materials within the container 12 as the flow control valve 19 moves upward (away from dispensing opening 13) and downward (toward dispensing opening 13), thereby promoting flow of powder through the dispenser while preventing clumping.

Figure 4:
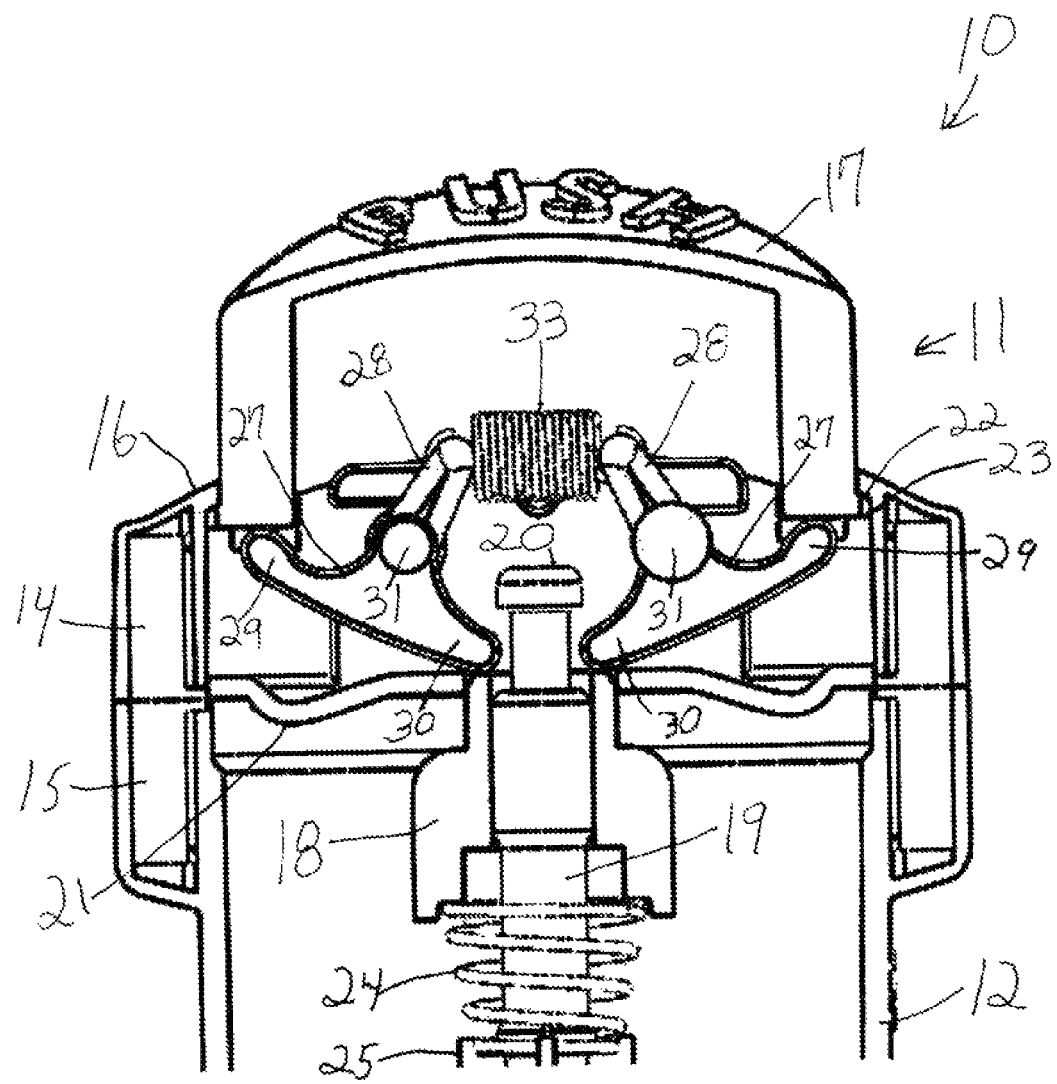
FIG. 4 shows an enlarged detailed section view through the dispenser in a valve closed position, with a portion of the button housing base removed to show the lever system within the button housing.

The removable button assembly 11 has two levers 27 which each have an axis 31. Extending from each axis 31 is a spring arm 28, a button arm 29, and a flow control valve arm 30 (see FIG. 4). The axes 31 are each contained rotatably in a horizontal slot 32 in a button housing base 21 attached within the button housing 16. The two spring arms 28 are attached to a button housing spring 33 which biases (pulls) the spring arms 28 towards each other. The details of these features of the removable button assembly 11 are shown more clearly in FIG. 4.

Figure 5:
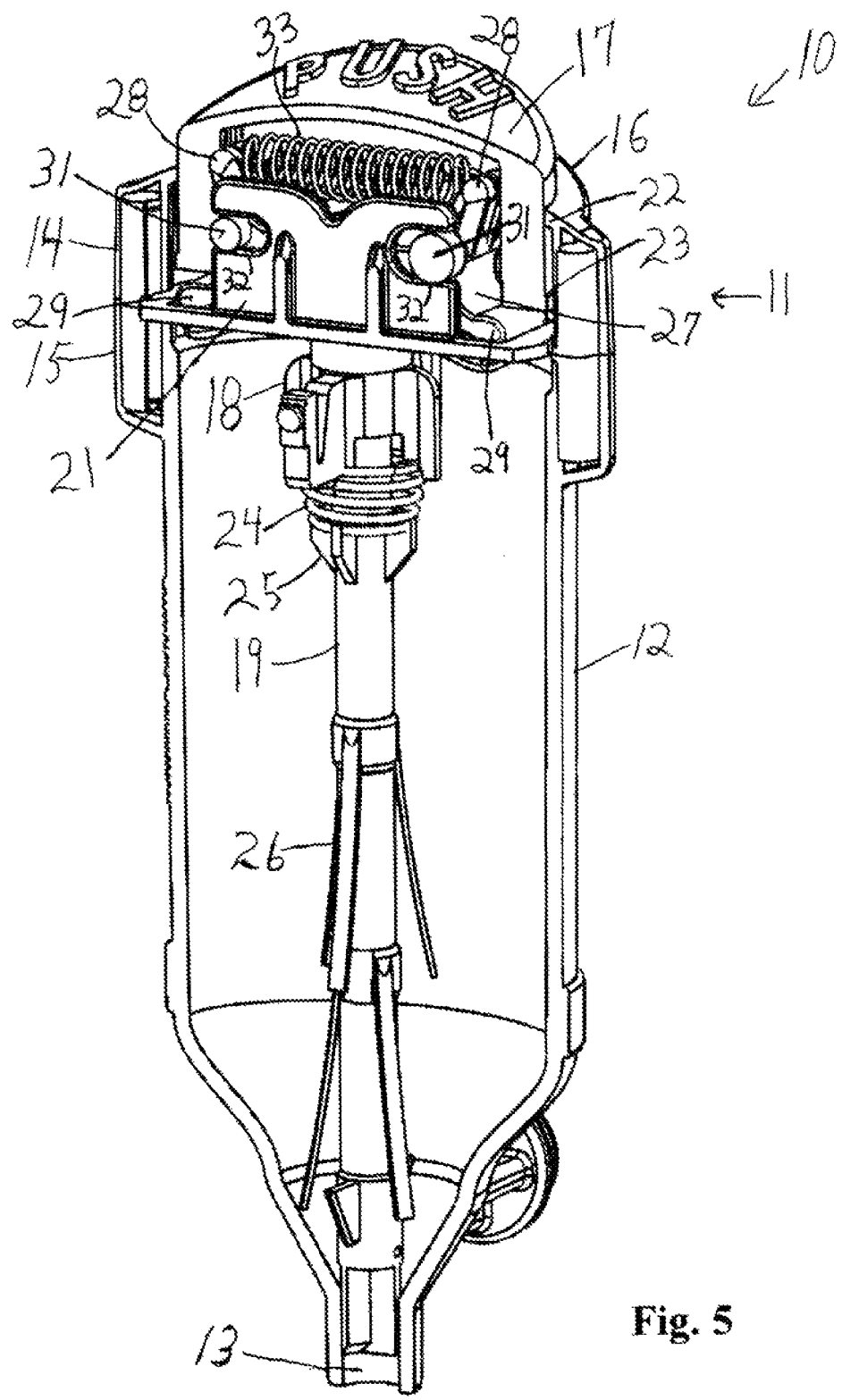
FIG. 5 shows a section view through the dispenser in a valve open position.

FIG. 5 shows a similar illustration of the view of FIG. 3 but with the flow control valve 19 in an open position so that powder or other material will flow out of the container 12 through dispensing opening 13. The button 17 is pushed downward, the spring arms 28 are pulled away from each other, the spring 33 is stretched, the flow control valve 19 is pushed upward, and the spring 24 is compressed between the flow control valve stabilizer 18 and the spring support 25. The details of these features are seen more clearly in FIG. 6.

Figure 6:
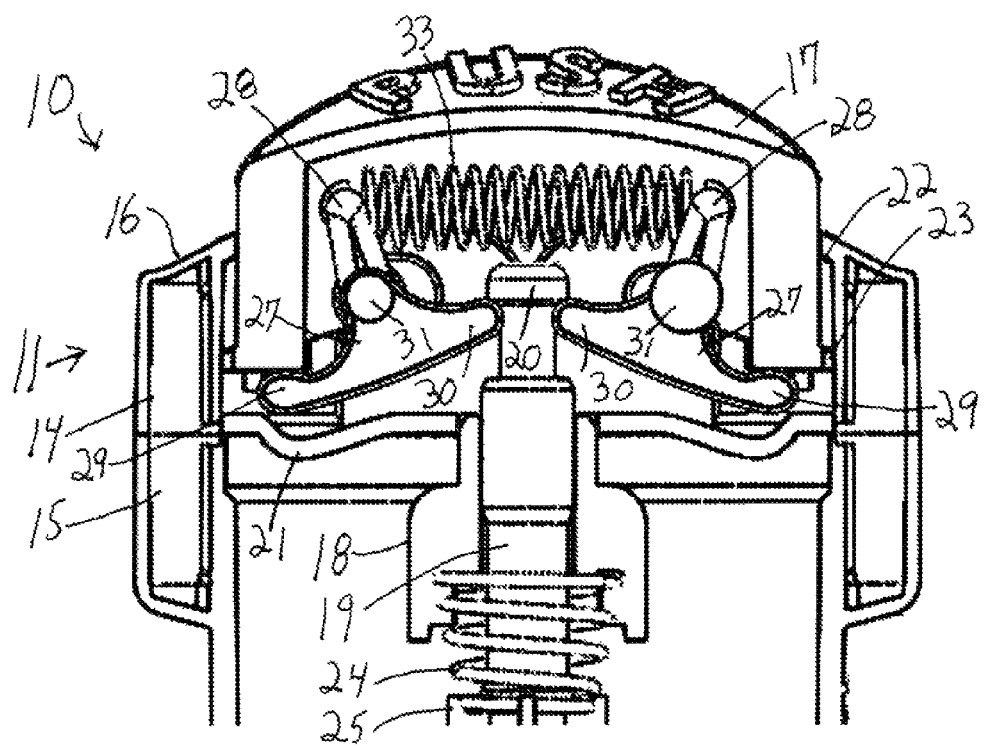
FIG. 6 shows an enlarged detailed section view through the dispenser in a valve open position, with a portion of the button housing base removed to show the lever system within the button housing.

In operation, the removable button assembly 11 is removed and powdered material is poured into container 12 through opening 9. The removable button assembly 11 is replaced onto the container 12. Referring to FIG. 6, a user depresses the button 17 and the button 17 engages the button arms 29 of the levers 27. The levers 27 pivot on axes 31 in horizontal slots 32, the button arms 29 rotate downward, the flow control valve arms 30 rotate upward and engage knob 20 on flow control valve 19, spring arms 28 rotate away from each other, and spring 33 is stretched. As the user continues to push button 17 downward, the flow control valve arms 30 will push up button 20 which lifts the flow control valve 19 upward, compressing spring 24 and pulling the flow control valve 19 away from dispensing opening 13, thereby opening the dispensing opening 13 so that material in container 12 will flow out of dispensing opening 13. The user holds the button 17 downward until the desired amount of material in container 12 is dispensed through the dispensing opening 13 of container 12. When the user releases button 17 the spring 24 will push the flow control valve 19 downward, thereby closing the dispensing opening 13. The spring 33 will pull the spring arms 28 towards each other and rotate the flow control valve arms 30 downwards away from knob 20 and the button arms 29 upwards. As the button arms 29 rotate upward they push the button 17 upwards until the button flange 23 of the button 17 engages the button housing flange 22 of the button housing 16.

The foregoing description has been limited to a specific embodiment of this invention. It will be apparent, however, that variations and modifications may be made by those skilled in the art to the disclosed embodiment of the invention, with the attainment of some or all of its advantages and without departing from the spirit and scope of the present invention. For example, the components of the powder dispenser can be made of plastic, metal, or a combination thereof. The knob on the flow control valve can be any type of structure which allows the flow control valve arm to push the flow control valve upwards so as to open the dispensing opening at the bottom of the container. The powder dispenser can be used with liquids, powders, and any particulate or granulated material, including powdered candy. The powder dispenser can be made attachable to a horizontal base, or to vertical wall, or made as a hand-held device that can be operated with one hand of a user.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A powder dispensing apparatus, comprising:
   a) a button assembly and a container, wherein said button assembly is removable from said container;
   b) said button assembly having a button housing and a button;
   c) said container having a flow control valve stabilizer at a first end of said container;
   d) a flow control valve extending through said flow control valve stabilizer and into a dispensing opening at a second opposite end of said container to close said dispensing opening, wherein said flow control valve is biased to extend into said dispensing opening;
   e) said button causing said flow control valve to move out of said dispensing opening, thereby opening said dispensing opening, when said button is pushed into said button housing, wherein said button is biased to extend out of said button housing;
   f) said flow control valve extending through a flow control valve spring, said flow control valve having a spring support which positions said flow control valve spring between said flow control valve stabilizer and said spring support to bias said flow control valve into said dispensing opening to close said dispensing opening; and
   g) said button housing having two levers, each of said levers having a spring arm, a button arm, and a flow control valve arm, wherein each of said spring arms are connected to a button housing spring which biases said spring arms towards each other so that said button arms are biased to engage said button and to extend said button out of said button housing, and said flow control arms are biased to rotate away from a knob on a first end of said flow control valve, said first end of said flow control valve extending into said button housing, wherein when said button is pushed into said button housing said button arms are rotated towards said container, said flow control valve arms rotated towards said knob to push said knob towards said button and pull a second opposite end of said flow control valve out of said dispensing opening, and said spring arms are rotated away from each other so that said button housing spring is stretched and said flow control valve spring is compressed.

2. The powder dispensing apparatus of claim 1, further comprising said flow control valve having one or more agitators attached thereto to agitate material within said container as said flow control valve moves into and out of said dispensing opening.

3. The powder dispensing apparatus of claim 2 wherein when said button assembly is removed from said container an opening into said container is provided to fill said container with material.

4. A powder dispensing apparatus, comprising:
 a) a button assembly and a container, wherein said button assembly is removable from said container;
 b) said button assembly having a button housing and a button;
 c) a flow control valve extending into a dispensing opening at a second opposite end of said container to close said dispensing opening, wherein said flow control valve is biased to extend into said dispensing opening;
 d) said button causing said flow control valve to move out of said dispensing opening, thereby opening said dispensing opening, when said button is pushed into said button housing, wherein said button is biased to extend out of said button housing; and
 e) said button housing having two levers, each of said levers having a spring arm, a button arm, and a flow control valve arm, wherein said spring arms are biased towards each other so that said button arms are biased to engage said button and to extend said button out of said button housing, and said flow control arms are biased to rotate away from a knob on a first end of said flow control valve, said first end of said flow control valve extending into said button housing, wherein when said button is pushed into said button housing said button arms are rotated towards said container, said flow control valve arms rotated towards said knob to push said knob towards said button and pull a second opposite end of said flow control valve out of said dispensing opening, and said spring arms are rotated away from each other.

5. The powder dispensing apparatus of claim 4, further comprising said flow control valve having one or more agitators attached thereto to agitate material within said container as said flow control valve moves into and out of said dispensing opening.

6. The powder dispensing apparatus of claim 4 wherein when said button assembly is removed from said container an opening into said container is provided to fill said container with material.

7. A powder dispensing apparatus, comprising:
 a) a container having an upper end and a lower end, wherein said lower end has a dispensing opening for dispensing powder from said container;
 b) a flow control valve mounted within said container and extending vertically from said upper end of said container to said lower end of said container, wherein said valve has a lower end biased into said dispensing opening to close said dispensing opening;
 c) a button assembly reversibly secured to said upper end of said container, wherein said button assembly has a button biased upwardly from said button assembly and a lever pivotably mounted within said button assembly;
 d) wherein said lever has a button arm and a valve arm, wherein said button arm is biased into engagement with an inner surface of said button and said valve arm is biased out of engagement with an upper end of said valve; and
 e) wherein said button is operable to pivot said button arm downward as said button is pushed downward, wherein said lever is operable to pivot said valve arm upward as said button arm is pivoted downward, wherein said valve arm is operable to engage said upper end of said valve and lift said valve upward as said valve arm is pivoted upward, and wherein said lower end of said valve is operable to pull out of said dispensing opening as said valve is lifted upward and thereby allow powder to dispense from said container.

8. A powder dispensing apparatus, comprising:
 a) a container having an upper end and a lower end, wherein said lower end has a dispensing opening for dispensing powder from said container;
 b) a flow control valve mounted within said container and extending vertically from said upper end of said container to said lower end of said container, wherein said valve has a lower end biased into said dispensing opening to close said dispensing opening;
 c) a button assembly attached to said upper end of said container, wherein said button assembly has a button biased upwardly from said button assembly and a lever pivotably mounted within said button assembly;
 d) wherein said lever has a button arm and a valve arm, wherein said button operably engages said button arm; and
 e) wherein said button is operable to pivot said button arm downward as said button is pushed downward, wherein said lever is operable to pivot said valve arm upward as said button arm is pivoted downward, wherein said valve arm is operable to engage said valve and lift said valve upward as said valve arm is pivoted upward, and wherein said lower end of said valve is operable to pull out of said dispensing opening as said valve is lifted upward and thereby allow powder to dispense from said container.

* * * * *